United States Patent [19]

Garriss

[11] Patent Number: 5,010,412
[45] Date of Patent: Apr. 23, 1991

[54] HIGH FREQUENCY, LOW POWER LIGHT SOURCE FOR VIDEO CAMERA

[75] Inventor: Gregory M. Garriss, Federal Way, Wash.

[73] Assignee: The Boeing Company, Seattle, Wash.

[21] Appl. No.: 290,581

[22] Filed: Dec. 27, 1988

[51] Int. Cl.⁵ .......................... H04N 3/12; H04N 7/18
[52] U.S. Cl. ........................................ 358/240; 358/107; 356/23; 354/129; 354/132
[58] Field of Search ............... 358/107, 125, 212, 240, 358/241, 100; 356/23; 362/3, 11, 800; 354/129, 132, 140, 414

[56] References Cited

U.S. PATENT DOCUMENTS

| | | | |
|---|---|---|---|
| 3,737,722 | 6/1973 | Scharlack | 315/209 |
| 3,800,204 | 3/1974 | Kenny | 318/480 |
| 4,161,018 | 7/1979 | Briggs | 362/104 |
| 4,164,008 | 8/1979 | Miller et al. | 362/103 |
| 4,211,955 | 7/1980 | Ray | 315/53 |
| 4,264,845 | 4/1981 | Bednarz | 315/323 |
| 4,298,869 | 11/1981 | Okuno | 340/782 |
| 4,459,645 | 7/1984 | Glatter | 362/104 |
| 4,677,533 | 6/1987 | McDermott et al. | 362/240 |
| 4,882,498 | 11/1989 | Cochran et al. | 250/571 |

Primary Examiner—John K. Peng
Attorney, Agent, or Firm—Dellett, Smith-Hill & Bedell

[57] ABSTRACT

A strobe light provides uniformly intense, monochromatic illumination of an object photographed by a video camera. The strobe light includes a circuit board having a central aperture and a plurality of light-emitting diodes mounted on the circuit board and generally surrounding the aperture. The circuit board is attached to the camera with the aperture positioned in front of the camera lens such that the video camera views the object through the aperture as the diodes illuminate the object. The strobe light further includes an oscillator providing an output square wave signal of adjustable frequency and duty cycle. A transistor switch controlled by the square wave signal periodically connects a constant voltage across the diodes, thereby causing the diodes simultaneously to generate flashes of light with a frequency and duty cycle determined by the square wave signal.

13 Claims, 2 Drawing Sheets

HIGH FREQUENCY, LOW POWER LIGHT SOURCE FOR VIDEO CAMERA

BACKGROUND OF THE INVENTION

The present invention relates to light sources and in particular to a high frequency, low power light source employing light emitting diodes for illuminating an object photographed by a portable video camera.

Inspection systems sometimes employ a video camera to produce video signals representing light intensity at regularly spaced points on the surface of an object, for example a machine part to be engaged by an industrial robot. When a "frame grabber" converts the video signals into gray scale bit map data, a control computer can analyze the bit map data and determine the shape and position of the part. Some inspection systems use a variable frequency strobe light for illuminating a rotating or oscillating machine part monitored by the video camera to provide data representing the object as it appears at one or more selected positions during motion.

It is usually preferable that a light source uniformly illuminate a part under inspection. For example, if ambient light casts non-uniform shadows on the part, the camera can be fitted with a narrow band light filter for filtering out wavelengths of light other than the band of the light spectrum produced by the monochromatic light source. Since the intensity of ambient light "noise" within the narrow band is negligibly small compared with the intensity of the source, the ambient light interferes less with the monitoring process.

The light source should be light weight and rugged. It should require minimal maintenance, provide uniform illumination, generate little electrical noise or heat, and should not require a power source different from the one operating the camera. Incandescent, xenon, and fluorescent lights have been used as light sources, but have been found inconvenient or unacceptable in some applications because they require large, high voltage power supplies or generate too much heat or electrical noise. Such prior art light systems may also be too heavy or too fragile or may not be able to operate at a sufficiently high frequency or sufficiently low duty cycle.

Fiber optic ring lights provide a low infrared, uniform circle of light, but require a high intensity incandescent lamp as a source illuminator. The lamp is housed in a separate unit, and light is transmitted down a large diameter fiber optic cable to the ring light. The illuminator housings typically are very large in comparison to the ring light, require frequent replacement of the incandescent lamp, and generate large amounts of heat. In addition, the fiber optic cable coupling the lamp housing to the ring light is prone to internal fracturing due to the normal motions of a robotic end effector, requiring replacement. Fluorescent and cold cathode ring lights eliminate some of the above drawbacks in that they are light weight, generate minimal amounts of heat, and are uniform. However, problems inherent with these types of light sources are their requirement of a high voltage (>200 V.) power supply, mechanical fragility and low light output.

SUMMARY OF THE INVENTION

In accordance with an embodiment of the present invention, a light source for providing uniformly intense, monochromatic illumination of an object photographed by a video camera includes a plurality of monochromatic light-emitting diodes (LEDs) mounted on a surface of a circuit board or the like having a central aperture, with the diodes generally disposed in surrounding relation to said aperture. The LEDs are thereby arranged and directed in a pattern providing uniform illumination of the object. The circuit board is attached to the video camera such that the video camera views the object through the aforementioned aperture.

In accordance with a feature of the invention, an oscillator supplies an output signal of adjustable frequency and duty cycle and this oscillator output signal controls operation of a switch connecting a regulated voltage source to the aforementioned LEDs, causing the LEDs to generate pulses of uniformly intense, monochromatic light. In accordance with a further aspect of the invention, the oscillator operates when enabled by a synchronizing signal, produced by the camera, indicating when the camera starts acquiring an image. The LEDs are energized only when the camera is acquiring an image, minimizing the load of the strobe light on its power source such as, for example, the camera battery.

It is accordingly an object of the present invention to provide an improved light source that generates uniformly intense, monochromatic pulses of light over a range of frequencies and duty cycles.

It is another object of the present invention to provide an improved strobe light that is light weight and efficient, and operates from a low voltage power source.

It is a further object of the invention to provide an improved strobe light that is rugged, requires little maintenance and generates little electrical noise or heat.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

DESCRIPTION OF THE PREFERRED EMBODIMENT

Figure 1:
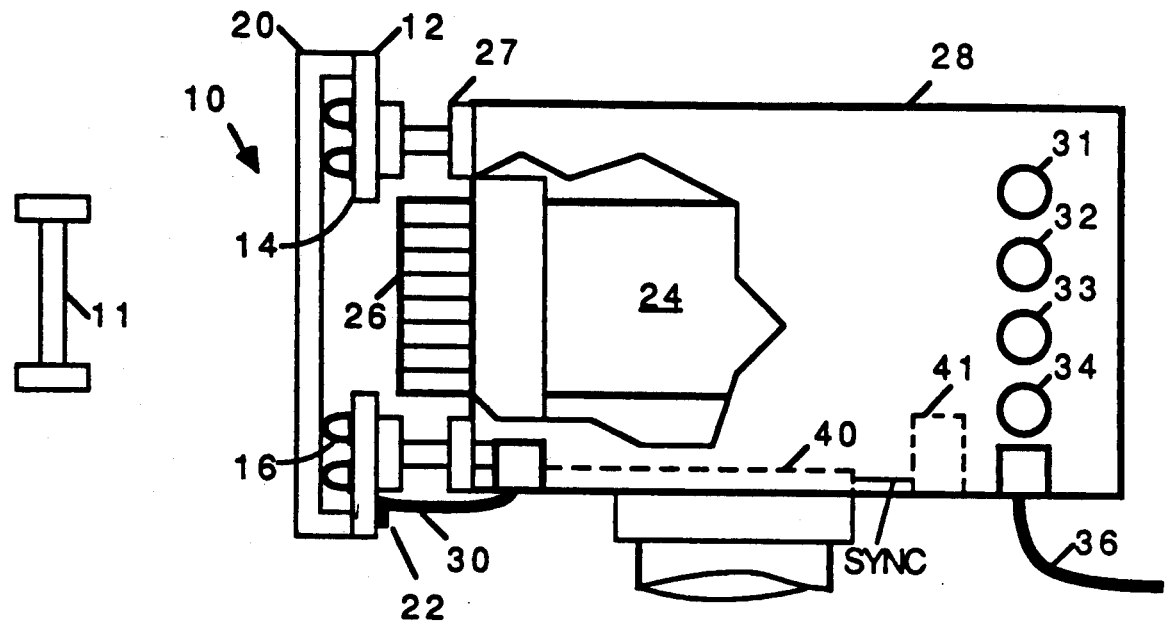
FIG. 1 is an elevational view of a strobe light flash assembly in accordance with the present invention as mounted on a video camera.
Figure 2:
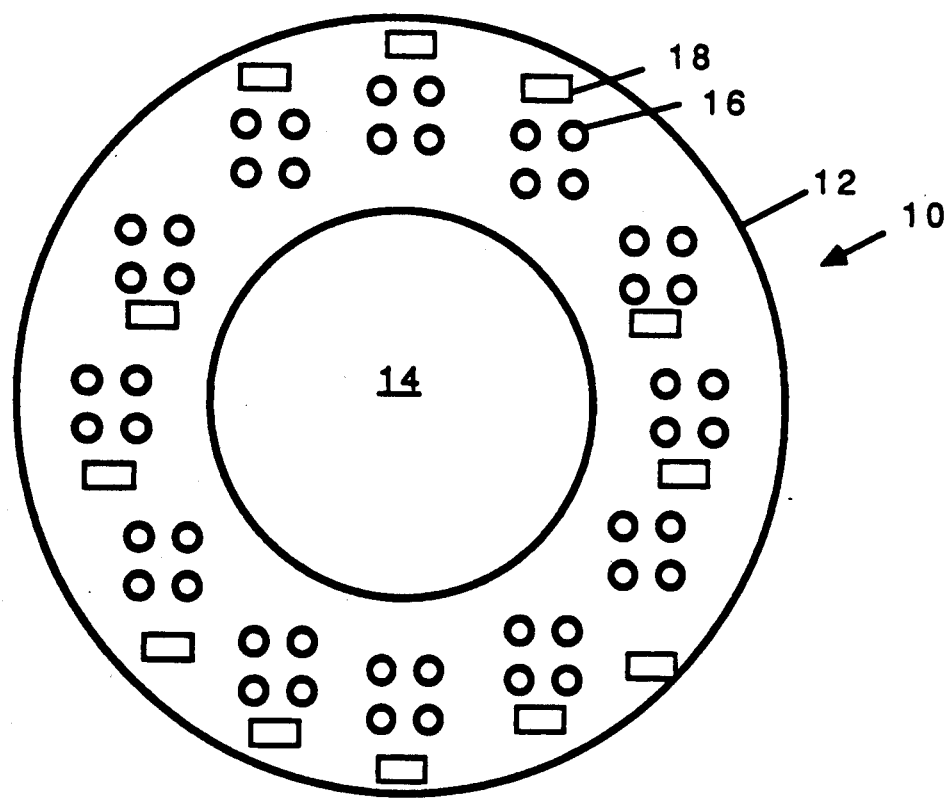
FIG. 2 is a front view of the strobe light flash assembly of FIG. 1.
Figure 3:
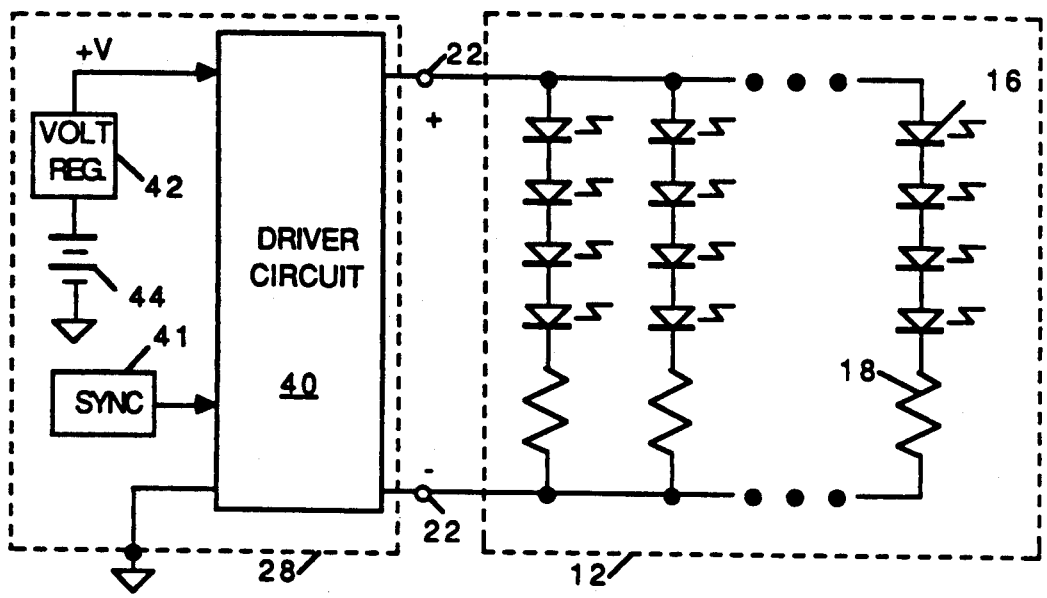
FIG. 3 is a combination block and schematic diagram of a strobe light in accordance with the present invention.

Referring to FIGS. 1 through 3, a light source in accordance with the present invention includes a flash assembly 10 mounted upon a circuit board 12 having a central aperture 14. A set of light-emitting diodes (LEDs) 16 and resistors 18 are positioned on circuit board 12 in surrounding relation to the aperture, while a protective, transparent plastic cap 20 suitably covers circuit board 12, LEDs 16 and resistors 18. Microstrip conductors on circuit board 12 connect LEDs 16 in series with resistors 18 between terminals 22 on the underside of the board. When a strobe signal pulse is applied across terminals 22, LEDs 16 generate a flash of light. The flash assembly 10 is desirably mounted on the housing 28 of a video camera 24 by means of supports 27, with lens 26 of camera 24 being positioned behind aperture 14 whereby camera 24 can record an image of an object 11 well illuminated by the flash from LEDs 16.

A driver circuit 40 which may be installed within housing 28 of camera 24 generates a strobe signal applied to the terminals 22 via a connector cable 30 extending between flash assembly 10 and camera housing 28. Pushbuttons 31 and 32 mounted on housing 28 can be employed to permit a user to select whether the strobe signal driving LEDs 16 is synchronized to camera operation and whether it is continuous or an oscillating square wave. When the strobe signal is continuous, the LEDs steadily illuminate object 11. When the strobe signal oscillates, the LEDs periodically flash to illuminate object 11 with a frequency and duty cycle as may be controlled by knobs 33 and 34 also mounted on camera housing 28.

Camera 24 generates video signals representing the light intensity at regularly spaced points on the surface of object 11 as illuminated by diodes 16. These signals may, for example, be conveyed via an external cable 36 to a conventional "frame grabber" (not shown) for converting the video signals into gray scale bit map data. A computer can analyze the bit map data output of the frame grabber and determine the shape and position of illuminated object 11. In an alternative embodiment, a frame grabber may be mounted within camera housing 28, and in such embodiment cable 36 conveys the bit map data from the frame grabber to a computer.

Referring in particular to FIG. 3, twelve sets of four LEDs 16 mounted on circuit board 12 are each connected in series with separate resistors 18 between terminals 22 of the flash assembly. As illustrated in FIG. 2, the sets of four LEDs, each comprising a square array, are uniformly spaced around board 12 and are positioned for illuminating an object "seen" by the camera. The driver circuit 40, energized by a regulated d.c. voltage source 42 (+V) suitably powered from a typical camera power supply mounted within the camera housing 28, provides the strobe signal across terminals 22. One terminal of driver circuit 40 is grounded to housing 28 while another input terminal of driver circuit 40 receives a synchronizing signal (SYNC) from the camera.

Figure 4:
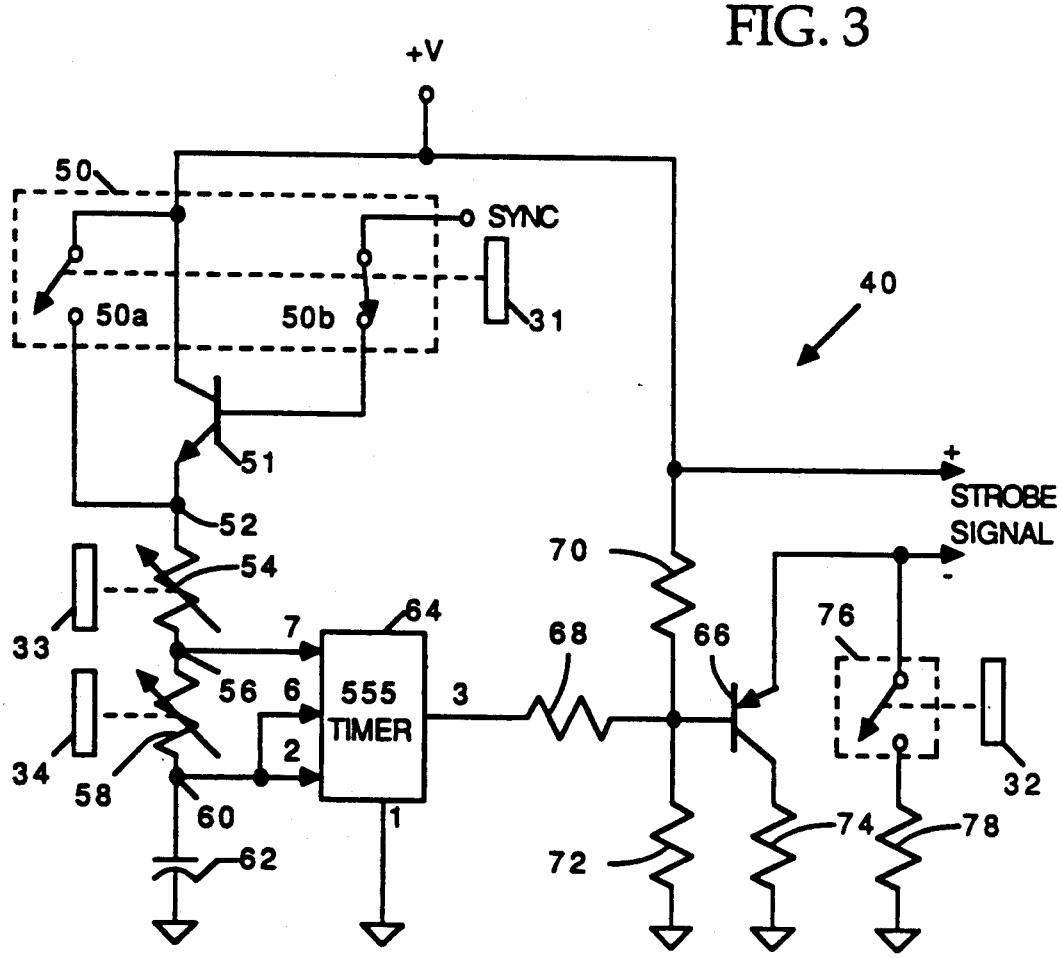
FIG. 4 is a schematic diagram of the driver circuit of FIG. 3.

Referring to FIG. 4, the driver circuit 40 comprises a switch 50 controlled by the aforementioned push button 31 mounted on the camera housing. One contact 50a of switch 50 selectively connects regulated voltage source +V directly to a circuit node 52. Another contact 50b selectively couples the synchronizing output signal of the camera to the base of npn transistor 51. The collector of transistor 51 is tied to +V while the emitter thereof is connected to node 52. Variable resistor 54 controlled by knob 33 of FIG. 1 is connected between node 52 and a node 56. In series therewith is another variable resistor 58 controlled by knob 34 of FIG. 1 and deposed between nodes 56 and 60 respectively connected to terminal 7, and to terminals 2 and 6, of a conventional type 555 timing circuit 64. A capacitor 62 returns node 60 to ground to complete a time constant circuit. Output pin 3 of timer 64 drives the base of a pnp transistor 66 through a resistor 68, also coupled to the center of a biasing voltage divider comprising resistors 70 and 72 connected between +V and ground. A resistor 74 returns the collector of transistor 66 to ground, while a switch 76 operated by push button 32 of FIG. 1 selectively grounds the emitter of transistor 66 through resistor 78. The output of driver circuit 40 is derived between +V and the emitter of transistor 66.

When a user wishes the strobe light to illuminate object 11 continuously, he closes switch 76 by operating push button 32, thereby causing current to flow from the +V voltage source to ground via diodes 16 and resistors 18 of FIG. 3 and resistor 78 of FIG. 4. For stroboscopic flash operation, the user opens switch 76 via push button 32 to the position shown and adjusts switch 50 using push button 31 to select the appropriate synchronizing mode. In one selected position of switch 50, contact 50a closes, connecting the +V voltage source to node 52, while contact 50b opens. When energized, timer 64 acts as an oscillator continuously producing a square wave signal at pin 3 of frequency and duty cycle respectively controlled by the settings of resistors 54 and 58.

The square wave output signal at pin 3 turns transistor 66 on and off. When transistor 66 turns on, current flows from source +V to ground through diodes 16 and resistors 18 of FIG. 3 and through transistor 66 of FIG. 4. As the current flows through diodes 16, it causes them to emit light, but when transistor 66 turns off, current ceases to flow through the diodes. Thus, diodes 16 generate pulses or flashes of light with a frequency and duty cycle determined by the square wave output of the timer 64 which the user may adjust using knobs 33 and 34 respectively.

When the operator selects a second position of switch 50, contact 50b closes to the position shown and contact 50a opens to the position shown. Contact 50b then couples the synchronizing output signal of the camera to the base of transistor 51. The camera's synchronizing means 41 drives the synchronizing signal high when acquiring an image and drives the synchronizing signal low when it is not acquiring an image. For example, the video element of a typical video camera comprises an array of charge-coupled devices (CCDs) each receiving light reflected by a separate area of the object being monitored by the camera. When light strikes such a charge coupled device element, it stores charge in proportion to the intensity and duration of light. After allowing light to strike the CCD array for a short period, the charge distribution on the array represents the light intensity distribution as monitored by the camera and after thus capturing the image on the CCD array, the camera generates a video signal by shifting the charges out of the array and converting them to a sequence of voltages proportional to the charges. The camera repeats operations of storing charges in the CCD array and shifting them out, thereby providing a video signal representing a sequence of images. The frame grabber digitizes the video signal to produce bit map data.

While the camera is capturing an image by allowing charge to build up on the CCD array, the camera's synchronizing means drives its output synchronizing signal high. This signal is normally used to synchronize operations of the video camera and the frame grabber or other device such as a video recorder receiving the video signal output of the camera. In the present circuit, this synchronizing signal also turns on transistor 51 of FIG. 4, with switch contact 50b closed, thereby coupling voltage source +V to node 52 and causing timer 64 to operate. Timer 64 produces a square wave signal at pin 3 initially synchronized with the sync signal from the camera and oscillating with frequency and duty cycle controlled by resistors 54 and 58. The square wave signal turns transistor 66 on and off for periodically energizing the LEDs as the video camera is acquiring an image. The timer 64 can alternatively be set to provide only one high frequency square wave half cycle at pin 3, to generate one flash timed with each camera sync pulse. When the camera is subsequently busy shifting charges out of the CCD array, the camera drives its output synchronizing signal low, and as the synchronizing signal goes low, it turns off transistor 51 of FIG. 4 for disconnecting the +V source from node 52. The output of timer 64 goes low, shutting off transistor 66 and preventing current from flowing through the LEDs. Thus, the strobe light only flashes when the camera is capturing an image and does not flash when the camera is processing data, minimizing the drain of the camera battery 44 of FIG. 3.

The strobe light of the present invention provides uniformly intense, monochromatic illumination of an object photographed by a video camera system. Timer 64 can flash the LEDs at frequencies (and correspondingly short pulse widths) up to 10 MHz, as opposed to 30–100 KHz maximum frequency of xenon strobe lights. The frequency and duty cycle of the strobe light are accurately controllable over wide ranges. Switching the lights at a high frequency, low duty cycle rate advantageously increases the light output by raising the current level while the minimized duty cycle prevents heating of the diodes and moderately improves diode life. Unlike laser or incandescent strobe lights, the LED strobe light is rugged, light weight and efficient, and operates from a low voltage power source. The strobe light of the present invention also requires little maintenance and generates little electrical noise or heat. Its regulated power supply controls available current, stabilizing the oscillator and light output thereof, and allowing operation from a camera power supply.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A light source for providing illumination of an object, said light source comprising:
   a diode for emitting light when energized;
   means for periodically energizing said diode with an adjustable frequency and duty cycle such that said diode emits a sequence of light flashes illuminating said object; and
   enabling means for selectively enabling and disabling said means for periodically energizing said diode, said enabling means being operatively responsive to a synchronization signal.

2. A light source for providing illumination of an object, said light source comprising:
   a diode for emitting light when energized; and
   means for periodically energizing said diode with an adjustable frequency and duty cycle such that said diode emits a sequence of light flashes illuminating said object;
   wherein said means for periodically energizing said diode comprises oscillator means for providing an oscillating output signal of adjustable frequency and duty cycle with the frequency being adjusted in accordance with a magnitude of an input frequency control value and the duty cycle being adjusted in accordance with the magnitude of an input duty cycle control value, means for generating a constant supply voltage, and switch means operated by said oscillating signal for periodically coupling said supply voltage to said diode with a frequency and duty cycle determined by the frequency and duty cycle of the oscillator output signal, said supply voltage energizing said diode such that said diode emits said light flashes.

3. A light source for providing monochromatic illumination of an object photographed by a camera acquiring an image of the object through a lens, the light source comprising:
   a plurality of diodes for emitting light when energized;
   means for attaching said diodes to said camera with said diodes arranged about said lens and directed for illuminating said object, and
   means for periodically energizing said diodes.

4. The apparatus in accordance with claim 3 wherein said camera is adapted to produce a synchronizing signal substantially concurrent with operation thereof, and including means controlling said energizing means and responsive to said synchronizing signal for energizing said diode when said camera is acquiring an image.

5. The apparatus in accordance with claim 3 wherein said means for energizing said diodes comprises:
   oscillator means for providing an oscillating output signal of predetermined frequency and duty cycle;
   means for providing a supply voltage;
   switch means operated by said oscillating signal for periodically coupling said supply voltage to said diodes with a frequency and duty cycle determined by the frequency and duty cycle of the oscillator output signal, said supply energizing said diodes such that said diodes concurrently and periodically illuminate said object.

6. A strobe light for providing uniformly intense, monochromatic illumination of an object photographed by a video camera acquiring a sequence of images of the object through a lens and asserting a synchronizing signal indicating when it is acquiring an image, the strobe light comprising:
   a plurality of diodes mounted on the video camera generally surrounding the lens, the diodes generating light of similar wavelength when energized by a supply source, the intensity of light generated by the diodes being determined by a voltage magnitude of said supply source;
   oscillator means responsive to said synchronizing signal for providing an output of adjustable frequency and duty cycle when said synchronizing signal indicates said video camera is acquiring an image, the frequency being adjusted in accordance with a magnitude of an input frequency control value, and the duty cycle being adjusted in accordance with the magnitude of an input duty cycle control value;
   means providing a supply source for energizing said diodes; and
   switch means operated by said oscillating signal for periodically coupling said supply source to said diodes with a frequency and duty cycle determined by the frequency and duty cycle of the oscillator output signal to cause diodes simultaneously to generate pulses of light.

7. A strobe light for providing uniformly intense, monochromatic illumination of an object photographed by a video camera acquiring a sequence of images of the object, the video camera generating a synchronizing signal indicating when it is acquiring an image, the strobe light comprising:

a support having an aperture;

a plurality of diodes mounted on said support and generally surrounding the aperture in a pattern providing substantially uniform illumination of the object when said support is in juxtaposition with said object, the diodes generating light of similar wavelength when energized by a supply signal, the intensity of light generated by the diodes being determined by a voltage magnitude of the supply signal;

means for attaching said support to the camera such that the video camera views the object through the aperture as said diodes illuminate said object;

oscillator means responsive to said synchronizing signal for providing an oscillating output signal of adjustable frequency and duty cycle when said synchronizing signal indicates said video camera is acquiring an image, the frequency being adjusted in accordance with a magnitude of an input frequency control value, and the duty cycle being adjusted in accordance with the magnitude of an input duty cycle control value;

a voltage source for generating an output voltage signal;

means for regulating said output voltage signal to produce a said supply signal of substantially constant voltage;

switch means operated by said oscillating signal for periodically applying said supply signal to said diodes with a frequency and duty cycle determined by the frequency and duty cycle of the oscillator output signal, said supply signal causing said diodes to generate light simultaneously;

first means responsive to user input for generating said frequency control value; and second means responsive to user input for generating said duty cycle control value.

8. An apparatus for photographing an object, comprising;

a camera for acquiring an image of the object through a lens when said object is illuminated;

a plurality of diodes for emitting light when energized;

means for attaching said diodes to said camera with said diodes substantially uniformly distributed about said lens, such that when energized, said diodes illuminate said object with substantially uniform light intensity; and means for concurrently energizing said diodes.

9. The apparatus in accordance with claim 8 wherein said means for concurrently energizing said diodes comprises:

oscillator means for providing an oscillating output signal of adjustable frequency and duty cycle, the frequency being adjusted in accordance with a magnitude of an input frequency control value, and the duty cycle being adjusted in accordance with the magnitude of an input duty cycle control value;

means for generating a constant voltage supply signal; and switch means operated by said oscillating signal for periodically coupling said supply signal to said diodes with a frequency and duty cycle determined by the frequency and duty cycle of the oscillator output signal, said supply signal energizing said diodes such that said diodes concurrently emit light.

10. Tho apparatus in accordance with claim 8 wherein said camera comprises a video camera including means for generating a synchronizing signal wherein said means for concurrently energizing said diodes comprises:

oscillator means responsive to said synchronizing signal for providing an output signal when said synchronizing signal indicates said video camera is acquiring said image;

means for generating a constant voltage supply; and switch means operated by said oscillating signal for periodically coupling said supply to said diodes with a frequency and duty cycle determined by the frequency and duty cycle of the oscillator output signal.

11. A method for illuminating an object photographed by a camera acquiring an image of the object through a lens, the method comprising the steps of:

generally surrounding said lens with a plurality of diodes that emit light when energized such that said light illuminates said object; and periodically energizing said diodes.

12. A method for providing monochromatic stroboscopic illumination of an object photographed by a video camera acquiring a sequence of images of the object through a lens, the video camera generating a synchronizing signal indicating image acquisition, the method comprising the steps of:

generally surrounding said lens with a plurality of diodes that emit light when energized by a supply signal, said diodes being positioned such that their emitted light illuminates said object, the intensity of light generated by the diodes being determined by a voltages magnitude of the supply signal;

providing an oscillating output signal of predetermined frequency and duty cycle when said synchronizing signal indicates said video camera is acquiring an image; and applying said supply signal to said diodes in response to said oscillating output signal with a frequency and duty cycle determined by the frequency and duty cycle of the oscillating output signal, said supply signal causing said diodes to generate pulses of light.

13. A light source for providing illumination of an object, said light source comprising:

a diode for emitting light when energized;

means for periodically energizing said diode such that said diode emits a sequence of light flashes illuminating said object; and enabling means for selectively enabling and disabling said means for periodically energizing said diode, said enabling means being operatively responsive to a camera synchronization signal.

* * * * *